United States Patent
Kim et al.

(10) Patent No.: US 8,285,143 B2
(45) Date of Patent: Oct. 9, 2012

(54) METHOD OF ALLOCATING BANDWIDTH OF PASSIVE OPTICAL NETWORK

(75) Inventors: Tae Yeon Kim, Daejon (KR); Kang bok Lee, Daejon (KR); Eui Suk Jung, Daejeon (KR); Jea Hoon Yu, Daejeon (KR); Byoung Whi Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 912 days.

(21) Appl. No.: 12/284,247

(22) Filed: Sep. 19, 2008

(65) Prior Publication Data

US 2009/0154939 A1    Jun. 18, 2009

(30) Foreign Application Priority Data

Dec. 18, 2007   (KR) .................. 10-2007-0133776

(51) Int. Cl.
*H04J 14/00* (2006.01)
(52) U.S. Cl. ............................ 398/69; 398/75; 398/168
(58) Field of Classification Search .................. 398/75, 398/69
See application file for complete search history.

(56) References Cited

U.S. PATENT DOCUMENTS

| | | | |
|---|---|---|---|
| 2005/0158048 A1* | 7/2005 | Sung et al. | 398/66 |
| 2006/0153564 A1* | 7/2006 | Ryu et al. | 398/69 |
| 2007/0154217 A1* | 7/2007 | Kim et al. | 398/72 |

FOREIGN PATENT DOCUMENTS

| KR | 10-2003-0073472 A | 9/2003 |
|---|---|---|
| KR | 10-2006-0059541 A | 6/2006 |

OTHER PUBLICATIONS

Clarke, F., et al., "Simultaneous and Interleaved Polling: An Upstream Protocol for WDM-PON." IEEE/OSA Optical Fiber Communication Conference (OFC 2006), Mar. 2006.

* cited by examiner

*Primary Examiner* — Patrick Stafford
*Assistant Examiner* — Xinning Niu
(74) *Attorney, Agent, or Firm* — Blakely, Sokoloff, Taylor & Zafman (57) ABSTRACT

In a method of allocating a bandwidth of a passive optical network, downward data are transmitted by varying a wavelength based on a wavelength division method and upward data are transmitted using a time division method. Thereby, by efficiently allocating a network bandwidth, data can be transmitted and by realizing statistical multiplexing, transmission efficiency can be improved.

3 Claims, 6 Drawing Sheets

METHOD OF ALLOCATING BANDWIDTH OF PASSIVE OPTICAL NETWORK

CROSS-REFERENCE TO RELATED APPLICATION

This application claims the benefit of Korean Application No. 10-2007-0133776, filed on Dec. 18, 2007 in the Korean Intellectual Property Office, the disclosure of which is incorporated herein by reference.

BACKGROUND OF THE INVENTION

1. Field of the Invention

The present invention relates to a method of allocating a bandwidth of a passive optical network that can dynamically allocate a bandwidth necessary for transmitting data to an uplink or a downlink between an optical line termination and an optical network terminal in the passive optical network.

This work was supported by the IT R & D program of MIC/IITA [2007-S-014-01, "Metro-Access Integrated Optical Network Technology"].

2. Description of the Related Art

As an optical line termination (hereinafter, referred to as 'OLT') and a plurality of optical network terminals (hereinafter, referred to as 'ONT') are connected, a passive optical network (hereinafter, referred to as 'PON') has an ONT structure for forming distribution topology of a tree structure.

Time division multiple access (TDMA)-PON can use a cheap optical element of a single wavelength and has a structure in which several ONTs share one wavelength. Accordingly, the TDMA-PON has an advantage in a broadcasting service such as a high-definition internet protocol television (IPTV) in downward transmission and has an advantage of statistical multiplexing according to a request band of ONTs in upward transmission.

However, because the TDMA-PON originally uses each of an upward wavelength and a downward wavelength, the TDMA-PON has low efficiency of an optical link and it is difficult for the TDMA-PON to divide and use one optical fiber into several subscribers because power loss increases according to the quantity by which an optical power distributor is divided.

Because wavelength division multiplexing (WDM)-PON uses a wavelength per subscriber using a conventional method, a service band of a subscriber is sufficient, and because an optical link is used with several wavelengths, the WDM-PON has an advantage of maximizing efficiency of an optical link. However, the WDM-PON has an inflexible and static structure in which an optical element cost due to wavelength multiplexing is relatively higher than that of the TDMA-PON and in which subscribers cannot statistically share and use a band. Nevertheless, so far, the WDM-PON is regarded as a final solution that can be applied to an optical network after the TDMA-PON.

However, although the speed of the optical link gradually increases from 1 G to 10 G or 100 G, a band requested by a subscriber is sustained in a speed of less than 100 Mbps. This is because a killer application for surely upgrading the service does not exist. Therefore, at a current time point, a method in which several ONTs can share one optical wavelength by gradually combining a statistical multiplexing method of the TDM-PON to construction of a WDM-PON network than to construct only the WDM-PON network, is requested.

In an existing TDMA-PON, a broadcast method is used with a single wavelength in downward transmission and an uplink signal is received in a burst mode using a TDMA method of ONTs in upward transmission. However, in a wavelength synchronous hybrid PON, in downward transmission, because a wavelength is varied and transmitted without using a single wavelength, data should be transmitted in a burst mode in even a downlink and thus scheduling of a wavelength is necessary. In upward transmission, because a reflective semiconductor optical amplifier (RSOA) method is used, a method of allocating an upward band of an ONT for transmitting upward data within a downward wavelength band is requested.

SUMMARY OF THE INVENTION

The present invention has been made in an effort to solve the above problems, and the present invention provides a method of allocating a bandwidth of a PON that can efficiently allocate a downward wavelength band and a band to an upward ONT according to a predetermined bandwidth allocation reference by allocating and transmitting a wavelength band in downward transmission and determining an upward band of an ONT using wavelength division or time division in upward transmission by synchronizing a wavelength using a wavelength division method in the PON.

According to an aspect of the present invention, there is provided a method of allocating a bandwidth of a PON, including: allocating, by an OLT, a wavelength to a plurality of transmission ports and setting a downward wavelength time period on a wavelength basis; transmitting data in units of a packet to a plurality of ONTs while varying the wavelength for a first downward wavelength time period using the divided wavelength; and varying, when the first downward wavelength time period terminates, the wavelength and transmitting data according to the changed wavelength.

According to another aspect of the present invention, there is provided a method of allocating a bandwidth of a PON, including: transmitting downward data to a plurality of ONTs through a first wavelength for a downward wavelength time period in which an OLT is set and receiving upward data and a report message from the plurality of ONTs through the first wavelength; setting a downward wavelength time period for a second wavelength according to the report message and a wavelength band allocation reference and allocating a bandwidth according to upward transmission based on the downward wavelength time period; and transmitting a gate message including downward data and the changed bandwidth information of upward transmission to the plurality of ONTs through the second wavelength for the preset downward wavelength time period.

According to the present invention, in a method of allocating a bandwidth of a PON, statistical multiplexing can be performed on a wavelength basis by dynamically allocating a bandwidth in downward transmission or upward transmission by synchronizing a wavelength and in even different wavelengths, because allocation of a wavelength band can be determined based on traffic, transfer efficiency thereof can be greatly improved, so that capacity of an optical link can be maximized and efficiency of the optical link can be greatly improved.

DESCRIPTION OF THE PREFERRED EMBODIMENT

Hereinafter, exemplary embodiments according to the present invention will be described in detail with reference to the accompanying drawings.

Figure 1:
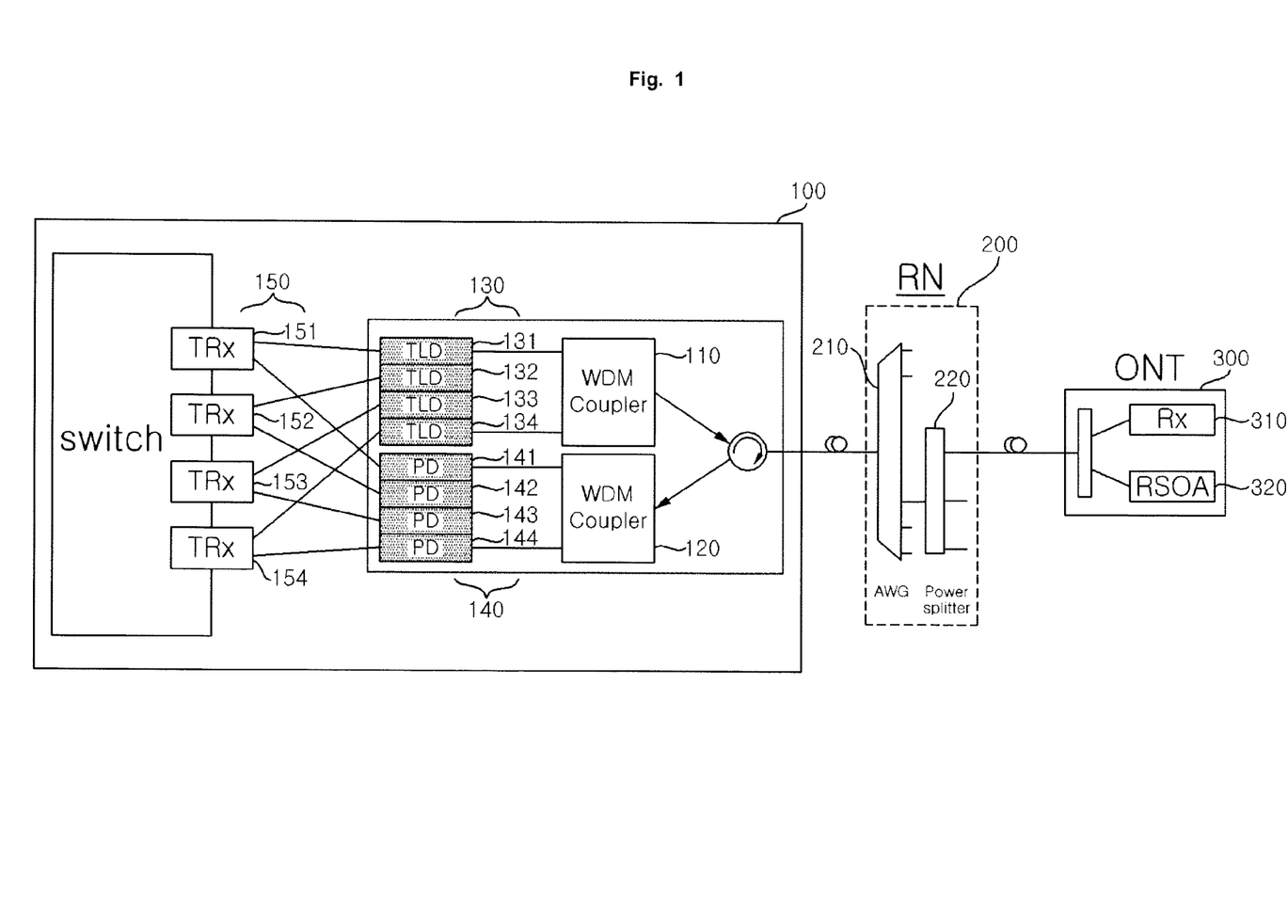
FIG. 1 is a diagram illustrating a configuration of a PON according to an exemplary embodiment of the present invention.

FIG. 1 is a diagram illustrating a configuration of a PON according to an exemplary embodiment of the present invention.

Referring to FIG. 1, in a PON, as an OLT 100 and a plurality of ONTs 300 are connected, data are transmitted and received through a downlink or an uplink. Further, a remote node RN 200 is connected between the OLT 100 and the plurality of ONTs 300.

The remote node RN 200 is power-branched to 512 optical cores to the maximum to be connected to the plurality of ONTs 300.

The OLT 100 has a plurality of switch ports TRx (150, 151 to 154) for transmitting and receiving a data frame, and a switch port TRx 150 has a transmission input port and a reception output port. Further, the OLT 100 includes a plurality of optical reception devices PD (141 to 144), a plurality of wavelength tunable laser diode TLD (131 to 134), a WDM coupler 110, and a WDM demux 120.

In this case, total 64 wavelengths are used in the PON and the quantity of power branches per wavelength is 8. Further, the quantity of wavelength tunable laser diodes TLD is, for example, 4.

In the OLT 100, when 64 wavelengths are multiplexed and received from the plurality of ONTs 300, the WDM demux 120 receive a wavelength using a round trip method through a cyclic demux. In this case, a wavelength output from a first wavelength tunable laser diode TLD 131 follows a set of a wavelength received in a first optical reception device PD 141 of the OLT. That is, because a wavelength input into the first optical reception device PD 141 is received within a group of wavelengths {1, 5, 9 . . . 57 and 61}, a wavelength transmitted from a first TLD 131 is selected from the group of wavelengths {1, 5, 9 . . . and 61}.

Tunable wavelength lists of each of the first to fourths TLD (131 to 134) connected to an input port of the WDM coupler 110 are as follows.

The first TLD 131 sends a wavelength of a range {1, 5, 9, 13 . . . and 61}, the second TLD 132 sends a wavelength of a range {2, 6, 10, 14 . . . and 62}, the third TLD 133 sends a wavelength of a range {3, 7, 11, 15 . . . and 63}, and the fourth TLD 134 sends a wavelength of a range {4, 8, 12, 16 . . . and 64}.

Accordingly, in the WDM coupler 110 of the OLT 100, downward wavelengths do not collide. Because the ONT 300 performs upward transmission with the same wavelength as that of a downward wavelength, upward wavelengths do not collide.

In this case, the TLD 130 of the OLT 100 and the upward PD 140 are synchronized with an identical wavelength. Accordingly, the PON according an exemplary embodiment of the present invention is a wavelength synchronous hybrid PON.

Figure 2:
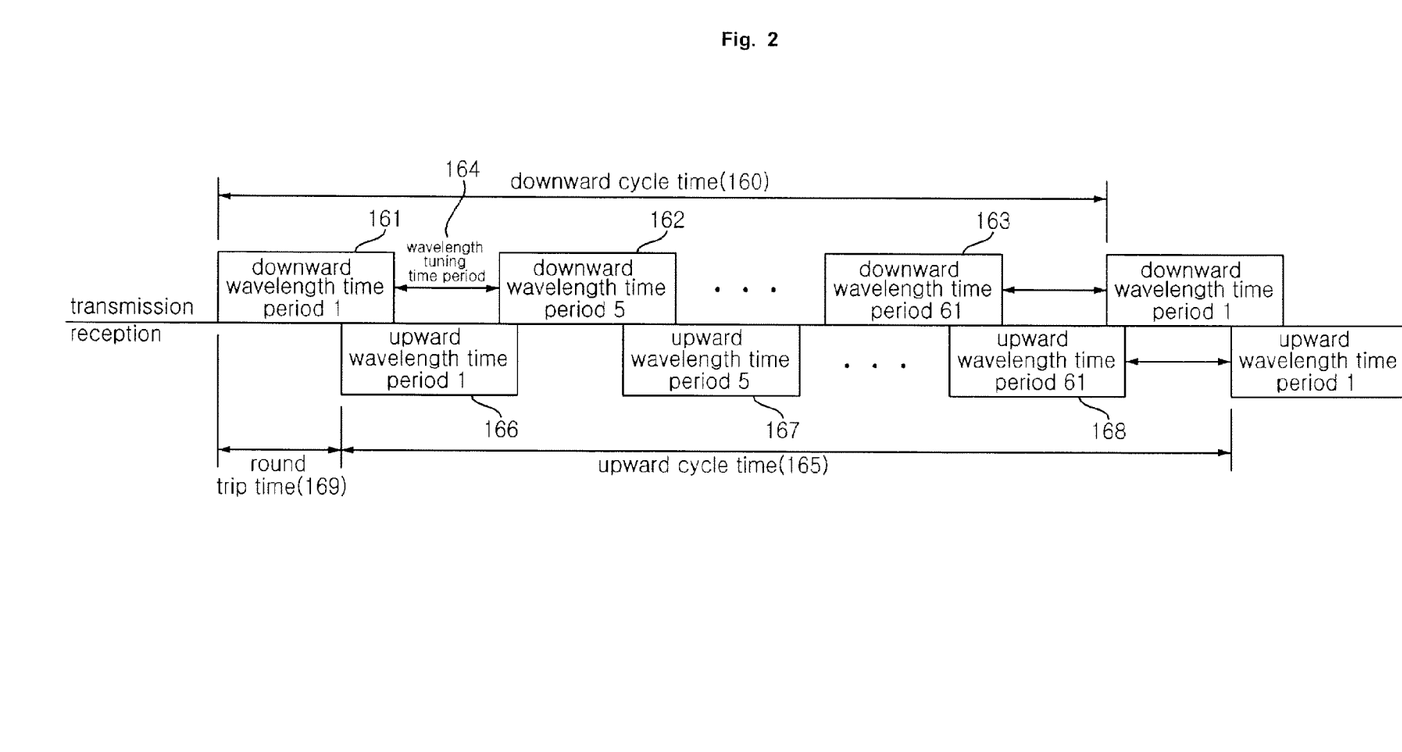
FIG. 2 is a diagram illustrating an example of upward transmission and downward transmission in a method of allocating a bandwidth of a PON according to an exemplary embodiment of the present invention.

FIG. 2 is a diagram illustrating an example of upward transmission and downward transmission in a method of allocating a bandwidth of a PON according to an exemplary embodiment of the present invention.

In a method of allocating a bandwidth of the PON i.e. a method of allocating a dynamic bandwidth of a wavelength synchronous hybrid PON, an upward wavelength time period is determined by a downward wavelength time period. A downward wavelength injected into the ONT 300 contains upward data and follows two of an attribute that performs upward re-transmission with an identical wavelength and an attribute that uses the TLD 130 in the OLT 100.

In this case, because a wavelength synchronous hybrid PON transmits data in units of a packet, not allocating a band in units of an ONT for a downward wavelength time period in downward transmission, a band is determined on a wavelength basis.

Referring to FIG. 2, one of transmission ports of the OLT 100 transmits downward data while varying a wavelength, as described above in upward transmission and downward transmission. That is, a first TLD 131 connected to a first switch port TRx 151 transmits downward data while varying a wavelength in an order of 1, 5, 9, and 13, as described above.

When the OLT 100 performs downward transmission according to a designated wavelength in each TLD 130, because total 64 wavelengths are used in four TLDs 130, a wavelength is varied and downward transmission is performed using 16 wavelengths for one downward cycle time 160 on the TLD 130 basis.

In this case, the downward cycle time 160 includes downward wavelength time periods (161, 162, and 163) and a wavelength tuning time period 164 and is a time taken until returning to a first wavelength after transmitting data in each of an entire wavelength. The downward wavelength time periods (161, 162, and 163) are a data transmission time period for downward transmission on a wavelength basis, and a wavelength tuning time period 164 is a time taken for varying a wavelength between the downward wavelength time periods (161, 162, and 163).

Here, according to a method of allocating a fixed band, a downward wavelength time period is a time obtained by dividing a downward cycle time by the quantity i.e. 16 of wavelengths using per TLD and by subtracting a wavelength tuning time period from the divided downward cycle time, and a downward wavelength time period on a wavelength basis is equally set.

For example, the first TLD 131 transmits data while varying a wavelength in an order of 1, 5, 9, and 13 and transmits again data while varying a wavelength in an order of 1, 5, and 9 after transmitting up to a final wavelength 61, and the downward cycle time 160 is the sum of times taken when transmitting data with a wavelength 1 to a final wavelength 61 before a wavelength 1 starts again.

Here, while the first TLD 131 performs downward transmission for the first downward wavelength time period 161 with a first wavelength, the second TLD 132 performs downward transmission with a second wavelength. Further, the third TLD 133 performs downward transmission with a third wavelength, and the fourth TLD 134 performs downward transmission with a fourth wavelength.

In this case, a downward wavelength time period on a wavelength basis i.e. a downward wavelength time period 1 (161), a downward wavelength time period 2 (162), and a downward wavelength time period 3 (163) are equal, as described above, and all downward wavelength time periods in each TLD 130 are also equal.

Accordingly, in the OLT, because each of a plurality of TLDs 130 performs downward transmission with different wavelengths, wavelengths do not collide.

Upward transmission from the ONT 300 is performed on a wavelength basis, and an upward transmission time period of the ONTs is called upward wavelength time periods (166, 167, and 168), and a time consumed up to a time point that receives again a signal of upward transmission with a first wavelength after upward transmission is performed in all wavelengths is called an upward cycle time 165.

In this case, the start of an upward wavelength time period is later than that of a downward wavelength time period. This is because an upward signal is transmitted through a downward signal and a round trip time (RTT) 169 is required when returning via a first ONT in the OLT 100. When a downward cycle time and an upward cycle time are the same, the time is called a total cycle time.

Figure 3:
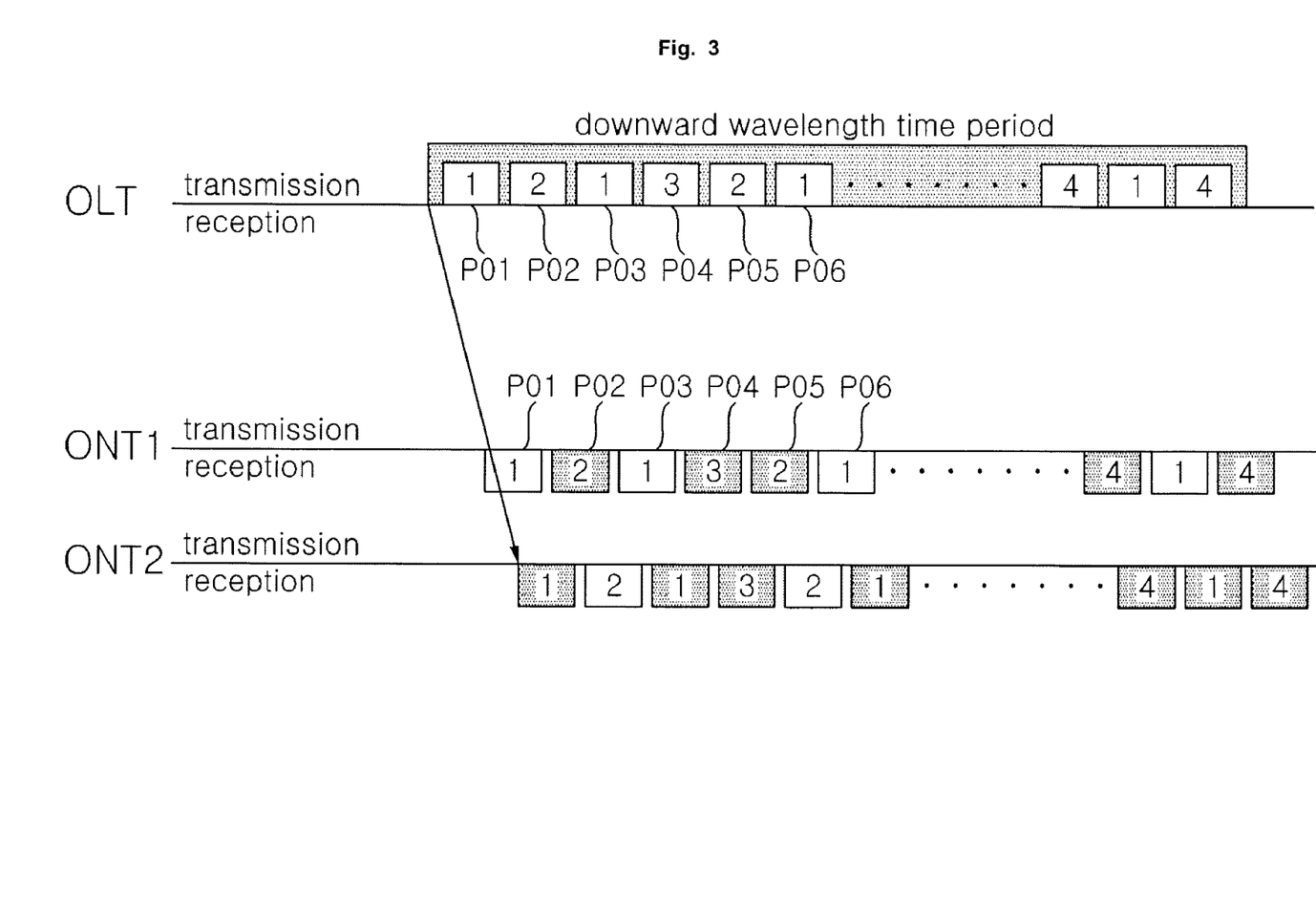
FIG. 3 is a diagram illustrating an example of downward packet transmission in a method of allocating a bandwidth of a PON according to an exemplary embodiment of the present invention.

FIG. 3 is a diagram illustrating an example of downward packet transmission according to a first exemplary embodiment in a method of allocating a bandwidth of a PON according to an exemplary embodiment of the present invention.

Referring to FIG. 3, in a first embodiment of a method of allocating a dynamic bandwidth of the PON, in downward transmission, when transmitting data belonging to the ONTs 300 on a wavelength basis for a downward wavelength time period, the OLT 100 transmits data in units of a packet, not appointing a time period on the ONT 300 basis. A downward packet transmitted in this way is broadcasted to the ONT on a wavelength basis in a remote node RN 200. In this case, each ONT 300 receives only its own packet and discards packets of other ONTs. In this case, in a wavelength synchronous hybrid PON, in downward transmission, a band is determined on a wavelength basis, not on an ONT basis.

For example, packet data i.e. packet data transmitted in an order of a first packet P01 transmitted to a first ONT, a second packet P02 transmitted to a second ONT, a third packet P03 transmitted to the first ONT, and a fourth packet P04 transmitted to a third ONT, transmitted from the OLT 100 for a downward wavelength time period, are broadcasted in each remote node RN 200 and transmitted to each ONT 300.

In this case, the first ONT receives only first, third, sixth packets (P01, P03, and P06), which are its own packets among the received first to sixth packets (P01 to P06) and discards second, fourth, and fifth packets (P02, P04, and P05), which are packets of other ONTs. Further, the second ONT receives only second and fifth packets P02 and P05 among packets broadcasted in this way and also discards the remaining packets.

Figure 4:
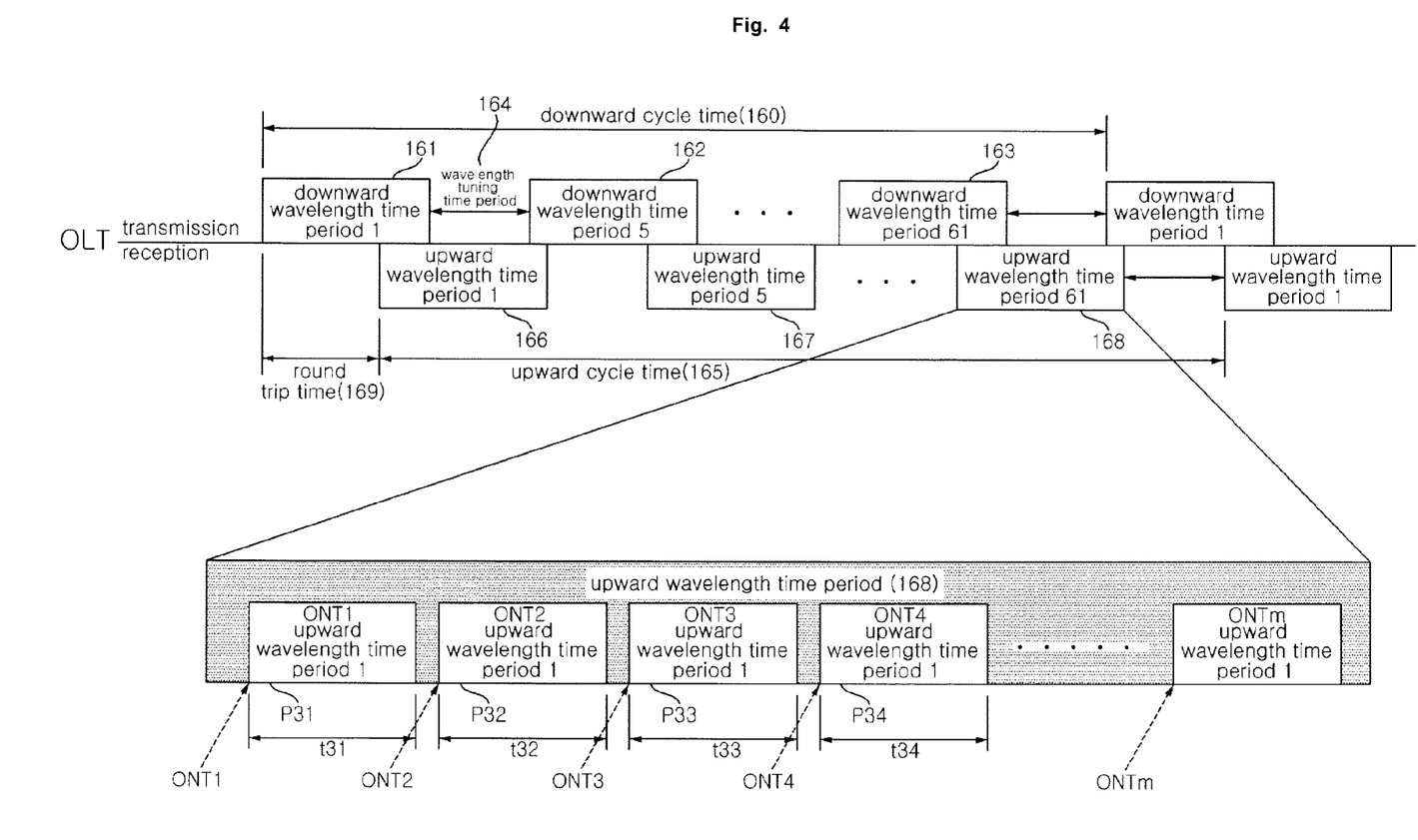
FIG. 4 is a diagram illustrating an example of upward packet transmission in a method of allocating a bandwidth of a PON according to an exemplary embodiment of the present invention.

FIG. 4 is a diagram illustrating an example of upward packet transmission in a method of allocating a bandwidth of a PON according to an exemplary embodiment of the present invention.

Unlike downward transmission, upward transmission is performed for only an appointed time period on an ONT basis in a wavelength synchronous hybrid PON. The upward transmission is performed by dividing an upward wavelength time period in units of an ONT and appointing a time period to the ONT.

Referring to FIG. 4, each ONT 300 transmits packet data at an appointed time period for different transmission time periods so that the OLT 100 may receive data without collision of packet data of the ONT 300 in a wavelength for an upward wavelength time period. When designated upward transmission is completed on a wavelength basis, upward transmission of an ONT belonging to the next wavelength is performed after changing to a next wavelength.

That is, for a third upward wavelength time period 168, the first ONT transmits data for a first upward transmission time period t31, and when a transmission time period of the first ONT is terminated, the second ONT transmits data for a second upward transfer time period t32.

As described above, in downward transmission, a band is not allocated to the ONT, but a band is allocated and transmitted in units of a packet based on wavelength division, and in upward transmission, a band is allocated in units of an ONT based on time division and the ONT transmits data at an appointed time period.

A method of allocating each band in such downward transmission and upward transmission is as follows.

A first exemplary embodiment of band allocation is static wavelength time-static slot time (SWT-SST). The SWT-SST sets an identical upward transmission time period on an ONT basis by uniformly dividing a downward transmission time period on a wavelength basis and dividing each upward transmission time period by the ONT quantity, whereby a band in downward transmission and upward transmission is fixedly determined.

That is, by dividing the total cycle time by the quantity of wavelengths serviced by the TLD 130, when a total cycle time is set, a downward transmission time period of each wavelength is determined, and by dividing a transmission time period of each wavelength by the maximum quantity of ONTs, an upward transmission time period of the ONT is determined.

In this case, in a method for allocating a fixed band, an upward cycle time is determined by a downward cycle time. Further, by dividing an upward wavelength time period uniformly divided by the wavelength quantity by the quantity of the ONTs, an upward transmission time period of each ONT is fixedly determined.

In this case, because a fixed period is used as a reference, data are transmitted as many as possible at an appointed time regardless of a data amount in upward transmission or downward transmission. However, a guard band for receiving a burst in upward transmission or downward transmission exists.

In this case, the ONT 300 transmits upward data thereof at an appointed time, and even if many data to transmit exist, data cannot be transmitted while exceeding a given time period, and even if few data exist, transmission of data are allocated to a designated ONT for a given time period.

The OLT 100 performs downward transmission for a fixed downward wavelength time period regardless of a packet amount advancing to the ONT belonging to a wavelength.

Because the SWT-SST has a preset total cycle time, a downward cycle time follows a total cycle time, a downward transmission time period per wavelength is calculated by Equation 1.

$$T^{down}_{wavlength} = \frac{T^{down}_{cycle} - T_{tuning} \cdot N^{tld}_{wavelength}}{N^{tld}_{wavelength}}$$ [Equation 1]

$$= \frac{T^{down}_{cycle}}{N^{tld}_{wavelength}} - T_{tuning}$$

where $T_{wavelength}^{down}$ is a downward wavelength transmission time period in the OLT i.e. a downward wavelength time period, $T_{cycle}^{down}$ is a downward cycle time (sec), $T_{tuning}$ a wavelength tuning time period, and $N_{wavelength}^{tld}$ is a service wavelength quantity of a TLD.

That is, a downward wavelength time period is obtained by dividing a downward cycle time by the service wavelength quantity of the TLD and subtracting a wavelength tuning time period from the divided time period.

In this case, the size of data transmitted in downward transmission per wavelength is calculated by a wavelength transmission time period, and in downward transmission, the size of data transmitted after subtracting the size of a burst mode guard band and the remaining expected value of a time slot from the size of data in the ONT is a transmission window of a downward wavelength. Finally, a value in which a wavelength transmission window is divided by a downward cycle time is an allocation band of a downward wavelength.

$$TW_{wavlength}^{down} = T_{wavelength}^{down} \times LinkRate - (G_{down} + E(R))$$ [Equation 2]

$$BW_{wavlength}^{down} = \frac{TW_{wavelength}^{down}}{T_{cycle}^{down}}$$ [Equation 3]

where $TW_{wavelength}^{down}$ is a downward wavelength window, $BW_{wavelength}^{down}$ is a downward wavelength bandwidth, $G_{DOWN}$ is a downward burst reception guard band, $E(R)$ is an expected value of the remaining time slot generated due to a packet length of a variable size in a time division method, and LinkRate is a transmission band of a wavelength synchronous hybrid PON link and has the same values in upward transmission and downward transmission.

As described above, an upward wavelength reception time period is determined according to a downward wavelength time period. In this case, a transmission window and a bandwidth of the ONT 300 within each wavelength are obtained by Equations 4 and 5.

$$TW_{ont}^{up} = \frac{T_{cycle}^{up} - N_{wavelength}^{tld} \cdot T_{tuning}}{N_{wavelength}^{tld} \cdot N_{ont}^{wavelength}} \times LinkRate - N_{ont}^{wavelength} \cdot (G + E(R))$$ [Equation 4]

$$BW_{ont}^{up} = \frac{TW_{ont}^{up}}{T_{cycle}^{up}}$$ [Equation 5]

where $TW_{ont}^{up}$ is an upward ONT window, $BW_{ont}^{up}$ is an upward ONT bandwidth, $T_{cycle}^{up}$ is an upward cycle time, $N_{ont}^{tld}$ is the ONT quantity belonging to the TLD, $N_{wavelength}^{tld}$ is the service wavelength quantity of the TLD, and $N_{ont}^{wavelength}$ is the ONT quantity belonging to one wavelength.

That is, by subtracting a wavelength tuning time period from an upward cycle time and then dividing the remaining time period by the wavelength quantity and the ONT quantity per wavelength, the size of upward data of the ONT is determined, and an upward ONT transmission window is obtained by subtracting an upward burst reception guard band and the remaining expected value on an ONT basis within a wavelength from this value.

Because a separate control protocol is unnecessary in upward transmission or downward transmission, the SWT-SST can be simply implemented.

Figure 5:
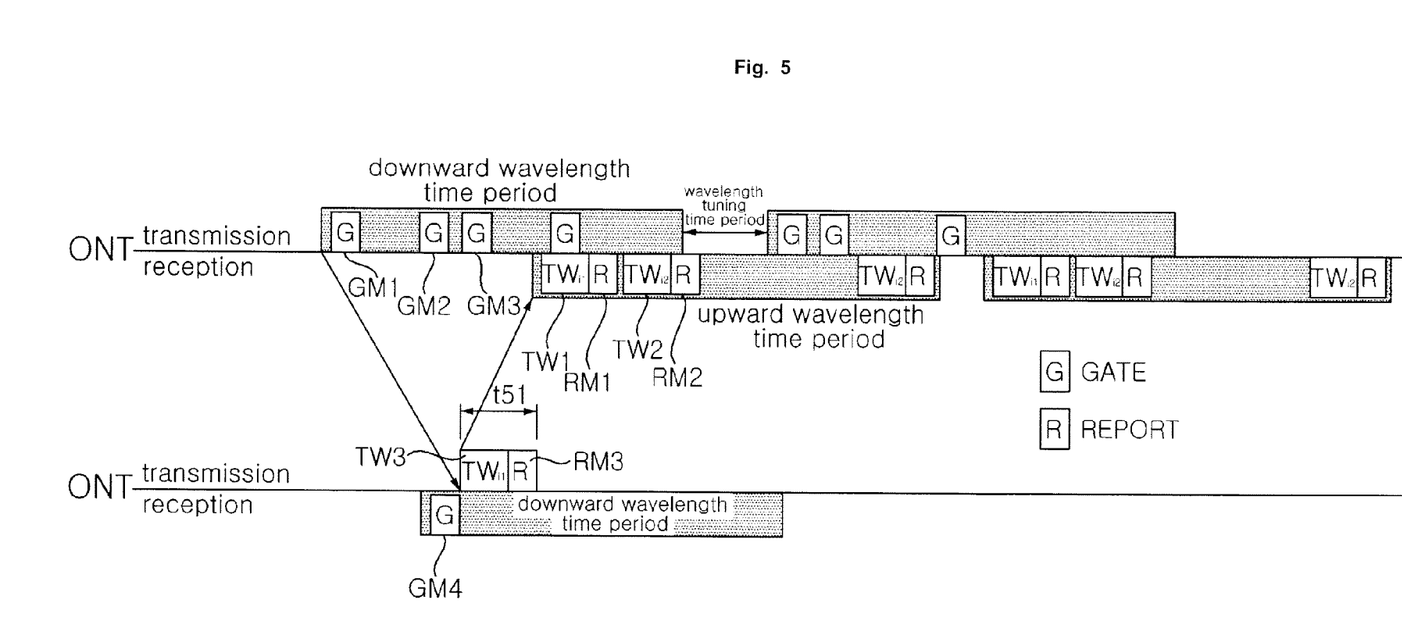
FIG. 5 is a diagram illustrating another transmission example in a method of allocating a bandwidth of a PON according to an exemplary embodiment of the present invention.

FIG. 5 is a diagram illustrating another transmission example in a method of allocating a bandwidth of a PON according to an exemplary embodiment of the present invention.

A second exemplary embodiment of a band allocation method is a static wavelength time-dynamic slot time (SWT-DST) method that fixes a wavelength time period using a polling method and that dynamically performs statistical multiplexing of the ONT within a wavelength using upward transmission of the ONT within a wavelength.

Referring to FIG. 5, if the OLT 100 notifies a start time and a sustain time appointed on the ONT 300 basis using a gate messages (GM1 to GM3), the ONT 300 receives a gate message GM4, thereby performing upward transmission. In this case, as the ONT 300 notifies an upward cue state thereof a report message RM3, a polling method of reflecting the state to a band allocation algorithm of the OLT 100 in a next cycle is used. The OLT 100 sets a next upward wavelength time period of the ONT 300 according to report messages RM1 and RM2 among data received by the ONT 300 and transmits the time period to the gate message.

Unlike the SWT-SST, because the SWT-DST uses a polling method for the ONTs 300 belonging to a wavelength, a transmission time period per wavelength i.e. a downward transmission time period per wavelength is similar to that of the SWT-SST, except for transmitting a gate message in a downward channel per wavelength.

If the ONT 300 receives a gate message one time for a downward wavelength time period, a downward wavelength window and a wavelength bandwidth are calculated by Equations 6 and 7.

$$TW_{wavlength}^{down} = T_{wavelength}^{down} \times LinkRate - (G_{down} + E(R)) - M_{GATE} \cdot N_{ONT}^{wavelength}$$ [Equation 6]

$$BW_{wavlength}^{down} = \frac{TW_{wavelength}^{down}}{T_{cycle}^{down}}$$ [Equation 7]

where $TW_{wavelength}^{down}$ is a downward wavelength window, $BW_{wavelength}^{down}$ is a downward wavelength bandwidth, and $M_{GATE}$ is the size of a gate message.

A bandwidth of a downward wavelength is a value obtained by dividing a downward wavelength window by a downward cycle time. An upward wavelength window is determined by a downward wavelength window in a wavelength synchronous hybrid PON.

That is, if distances between the OLT 100 and ONTs 300 are almost equal, the size of an upward wavelength window is the same as that of a downward wavelength window. In this case, upward transmission of the ONT 300 in the SWT-DST is scheduled by the OLT 100 based on a band requested by each ONT in a previous cycle.

If the size of a window requested by the ONTs through a report message is smaller than that of an upward wavelength window, a gate message is sent in a next cycle by additionally allocating the remaining upward wavelength windows to the ONT according to a ratio of a band requested by each ONT.

In this case, an upward ONT window allowed in the OLT can be calculated by Equations 8 and 9.

$$\text{if, } TW_{wavelength}^{up} > \sum_{j=1}^{v} TW_{ont(i,j)}^{report(n-1)} + v \cdot (M_{REPORT} + G_{up}), \quad [\text{Equation 8}]$$

$$TW_{wavelength(i)}^{excess(n-1)} =$$

$$TW_{wavelength}^{up} - \left( \sum_{j=1}^{v} TW_{ont(i,j)}^{report(n-1)} + v \cdot (M_{REPORT} + G_{up}) \right),$$

$$TW_{ont(i,j)}^{grant(n)} = TW_{ont(i,j)}^{report(n-1)} +$$

$$TW_{wavelength(i)}^{excess(n-1)} \cdot \frac{TW_{ont(i,j)}^{report(n-1)}}{\sum_{j=1}^{v} TW_{ont(i,j)}^{report(n-1)}},$$

for $j = 1, 2, \ldots, v$ $$\text{if, } TW_{wavelength}^{up} < \sum_{j=1}^{v} TW_{ont(i,j)}^{report(n-1)} + v \cdot (M_{REPORT} + G_{up}), \quad [\text{Equation 9}]$$

$$TW_{wavelength(i)}^{insufficient(n-1)} =$$

$$\left( \sum_{j=1}^{v} TW_{ont(i,j)}^{report(n-1)} + v \cdot (M_{REPORT} + G_{up}) \right) - TW_{wavelength}^{up},$$

$$TW_{ont(i,j)}^{grant(n)} = TW_{ont(i,j)}^{report(n-1)} -$$

$$TW_{wavelength(i)}^{insufficient(n-1)} \cdot \frac{TW_{ont(i,j)}^{report(n-1)}}{\sum_{j=1}^{v} TW_{ont(i,j)}^{report(n-1)}},$$

for $j = 1, 2, \ldots, v$ where $T_{wavelength}^{up}$ is an upward wavelength reception time period in the OLT, $TW_{ont}^{report}$ is an upward ONT window reported in the ONT, $M_{REPORT}$ is a message size in the report, $G_{up}$ is an upward burst reception guard band including RSOA on/off, $TW_{wavelength}^{excess}$ is the remaining wavelength window, $TW_{wavelength}^{insufficient}$ is a necessary wavelength window, $N_{wavelength}^{up}$ is an upward wavelength window, and $TW_{ont}^{grant}$ is an upward ONT window allowed by the OLT.

In contrast, in an (n−1) cycle, if the size of a window requested by the ONTs through a report message is greater than that of the upward wavelength window, an allowable window of the ONT is reduced according to a ratio of a band requested by each ONT by the necessary upward wavelength windows.

Therefore, in the SWT-DST, in an n-th cycle, an upward bandwidth of a j-th ONT belonging to a wavelength (i) is calculated by Equation 10.

$$BW_{ont(i,j)}^{up(n)} = \frac{TW_{ont(i,j)}^{grant(n)}}{T_{cycle}^{up}} \quad [\text{Equation 10}]$$

When adjusting an allowable window of the ONT in the SWT-DST, because a wavelength time period is fixed in the SWT-DST, an upward wavelength window cannot be changed. When using the SWT-DST, statistical multiplexing can be obtained in upward transmission of the ONT within a wavelength, however because an upward cycle time is fixed, an average band of an entire ONT belonging to a wavelength is not greatly changed.

In the SWT-SST method or the SWT-DST method, because a wavelength transmission time period was basically set, downward data for ONTs on a wavelength basis are included in a wavelength and transmitted for an allocated wavelength transmission time period without a separate consideration for downward transmission. Therefore, it is regarded that a downward band was set regardless of a downward data amount.

A third embodiment of a band allocation method is a dynamic wavelength time-dynamic slot time (DWT-DST) that dynamically uses both a wavelength time period and an upward transmission time period.

The DWT-DST is a method of variably using a downward wavelength time period as well as an upward time period of the ONT 300. In this case, a transmission time period of a wavelength is calculated based on an upward band request amount of a previous cycle of all ONTs 300 belonging to a wavelength and a data amount remained in a downward buffer of the ONTs 300 of a wavelength in a previous cycle.

Here, the OLT 100 notifies a start time and a sustain time appointed on an ONT 300 basis using a gate message, and the ONT 300 transmits data according to the start time and the sustain time. Finally, as the ONT 300 notifies an upward cue state thereof using a report message, a polling method of reflecting the state to a band allocation algorithm of the OLT 100 in a next cycle is used.

The DWT-DST allocates a bandwidth according to three references when allocating a wavelength band.

First, a minimum allocation method of allocating a bandwidth to the minimum is used.

That is, the OLT 100 selects a smaller value among an upward band request amount of a previous cycle of the ONTs 300 and a downward buffer size of a wavelength in a previous cycle, and a transmission time period, a downward wavelength band, and an upward window of the ONT according to a wavelength in the next cycle are calculated by Equation 11.

$$T_{wavelength(i)}^{down(n)} = \frac{\min\left( B_{wavelength(i)}^{down(n-1)} + v \cdot M_{GATE} + G_{down}, \sum_{j=1}^{v} TW_{ont(i,j)}^{report(n-1)} + v \cdot (M_{REPORT} + G_{up}) \right)}{LinkRate} \quad [\text{Equation 11}]$$

if, $B_{wavelength(i)}^{down(n-1)} + v \cdot M_{GATE} + G_{down} >$ $$\sum_{j=1}^{v} TW_{ont(i,j)}^{report(n-1)} + v \cdot (M_{REPORT} + G_{up}),$$

$$TW_{wavelength(i)}^{excess(n-1)} = \left( B_{wavelength(i)}^{down(n-1)} + v \cdot M_{GATE} + G_{down} \right) -$$

$$\left( \sum_{j=1}^{v} TW_{ont(i,j)}^{report(n-1)} + v \cdot (M_{REPORT} + G_{up}) \right)$$

$$T_{wavelength(i)}^{down(n)} = B_{wavelength(i)}^{down(n-1)} - TW_{wavelength(i)}^{excess(n-1)}$$

$$TW_{ont(i,j)}^{grant(n)} = TW_{ont(i,j)}^{report(n-1)}, \text{ for } j = 1, 2, \ldots, v$$

if, $B_{wavelength(i)}^{down(n-1)} + v \cdot M_{GATE} + G_{down} <$ $$\sum_{j=1}^{v} TW_{ont(i,j)}^{report(n-1)} + v \cdot (M_{REPORT} + G_{up}),$$

-continued $$TW_{wavelength(i)}^{insufficient(n-1)} =$$

$$\left(\sum_{j=1}^{v} TW_{ont(i,j)}^{report(n-1)} + v \cdot (M_{REPORT} + G_{up})\right) -$$

$$(B_{wavelength(i)}^{down} + v \cdot M_{GATE} + G_{down}),$$

$$TW_{ont(i,j)}^{grant(n)} = TW_{ont(i,j)}^{report(n-1)} -$$

$$TW_{wavelength(i)}^{insufficient(n-1)} \cdot \frac{TW_{ont(i,j)}^{report(n-1)}}{\sum_{j=1}^{v} TW_{ont(i,j)}^{report(n-1)}},$$

for $j = 1, 2, \ldots, v$, $$T_{wavelength(i)}^{down(n)} = B_{wavelength(i)}^{down(n-1)}$$

where $B_{wavelength}^{down}$ is a data amount in a downward data buffer of a wavelength in the OLT.

When calculating using a minimum allocation method, because a downward wavelength time period decreases, a total cycle time decreases, so that when traffic is not much, transmission delay of data decreases and a bandwidth increases. However, as a control protocol overhead increases and a traffic amount increases, an effect of transmission delay cannot be obtained. That is, a minimum allocation method becomes a reference for allocating a wavelength band to users of a service that has statistically less traffic and that is sensitive to transmission delay.

Further, a bandwidth can be allocated through a maximum allocation method.

In the maximum allocation method, a great value is selected among an upward band request amount of a previous cycle of the ONTs 300 and a downward buffer size of a predetermined wavelength in a previous cycle, and a transmission time period of a wavelength, a downward wavelength band, and an upward window of the ONT in the next cycle are calculated by Equation 12.

[Equation 12]

$$T_{wavelength(i)}^{down(n)} = \frac{\max\left(B_{wavelength(i)}^{down(n-1)} + v \cdot M_{GATE} + G_{down}, \sum_{j=1}^{v} TW_{ont(i,j)}^{report(n-1)} + v \cdot (M_{REPORT} + G_{up})\right)}{LinkRate}$$

if, $B_{wavelength(i)}^{down(n-1)} + v \cdot M_{GATE} + G_{down} >$ $$\sum_{j=1}^{v} TW_{ont(i,j)}^{report(n-1)} + v \cdot (M_{REPORT} + G_{up}),$$

$$TW_{wavelength(i)}^{excess(n-1)} = \left(B_{wavelength(i)}^{down(n-1)} + v \cdot M_{GATE} + G_{down}\right) -$$

$$\left(\sum_{j=1}^{v} TW_{ont(i,j)}^{report(n-1)} + v \cdot (M_{REPORT} + G_{up})\right),$$

$$T_{wavelength(i)}^{down(n)} = B_{wavelength(i)}^{down(n-1)},$$

$$TW_{ont(i,j)}^{grant(n)} =$$

$$TW_{ont(i,j)}^{report(n-1)} + TW_{wavelength(i)}^{excess(n-1)} \cdot \frac{TW_{ont(i,j)}^{report(n-1)}}{\sum_{j=1}^{v} TW_{ont(i,j)}^{report(n-1)}},$$

for $j = 1, 2, \ldots, v$ if, $B_{wavelength(i)}^{down(n-1)} + v \cdot M_{GATE} + G_{down} <$ $$\sum_{j=1}^{v} TW_{ont(i,j)}^{report(n-1)} + v \cdot (M_{REPORT} + G_{up}),$$

$$TW_{wavelength(i)}^{insufficient(n-1)} =$$

$$\left(\sum_{j=1}^{v} TW_{ont(i,j)}^{report(n-1)} + v \cdot (M_{REPORT} + G_{up})\right) -$$

$$(B_{wavelength(i)}^{down} + v \cdot M_{GATE} + G_{down}),$$

$$TW_{ont(i,j)}^{grant(n)} = TW_{ont(i,j)}^{report(n-1)}, \text{ for } j = 1, 2, \ldots, v,$$

$$TW_{wavelength(i)}^{down(n)} = B_{wavelength(i)}^{down(n-1)} + TW_{wavelength(i)}^{insufficient(n-1)}$$

Because the maximum allocation method transmits many data in one cycle, the maximum allocation method is appropriate a case of having much traffic, and when having less control protocol overhead and less traffic, a cycle increases and transmission delay and a bandwidth decrease. A maximum allocation reference is appropriate when allocating a wavelength band to a subscriber group that has much average traffic and that generally uses a high band of data service such as much transmission of data rather than transmission delay.

In another case, because two methods of a minimum allocation method and a maximum allocation method have conflicting merits and demerits, a compromise method of two methods can be used.

As in Equation 13, in a compromise allocation method, a great value is selected among an upward band request amount of a previous cycle of the ONTs and a downward buffer size of a wavelength in a previous cycle, and a minimum value is selected by comparing the great value with a maximum transmission window allowed in a wavelength.

[Equation 13]

$$T_{wavelength(i)}^{down(n)} =$$

$$\frac{\min\left(\max\left(B_{wavelength(i)}^{down(n-1)} + v \cdot M_{GATE} + G_{down}, \sum_{j=1}^{v} TW_{ont(i,j)}^{report(n-1)} + v \cdot (M_{REPORT} + G_{up})\right), TW_{wavelength(i)}^{max}\right)}{LinkRate}$$

where $TW_{wavelength}^{max}$ is a maximum allowable wavelength window.

In this case, a reasonable wavelength window that is unbiased to any one side is calculated. A compromise reference is appropriate when allocating a wavelength band to a subscriber section in which an upward band request amount and a downward buffer size have a great difference. This is because in a compromise allocation method, a maximum value among two is selected and a wavelength band that does not exceed a maximum transmission window is allocated.

By calculating with this method, a downward wavelength bandwidth and an upward ONT bandwidth in the DWT-DST are obtained by Equation 14.

$$BW_{wavelength(i)}^{down(n)} = \frac{TW_{wavelength(i)}^{down(n)}}{T_{cycle(n)}^{down}}$$ [Equation 14]

$$BW_{ont(i,j)} = \frac{TW_{ont(i,j)}^{grant(n)}}{T_{cycle(n)}^{up}}, \text{ for } j = 1, 2, 3 \ldots, v$$

$$T_{cycle(n)}^{up} = T_{cycle(n)}^{down} = \sum_{i=1}^{w} \left( T_{wavelength(i)}^{down(n)} + T_{tuning} \right)$$

Figure 6:
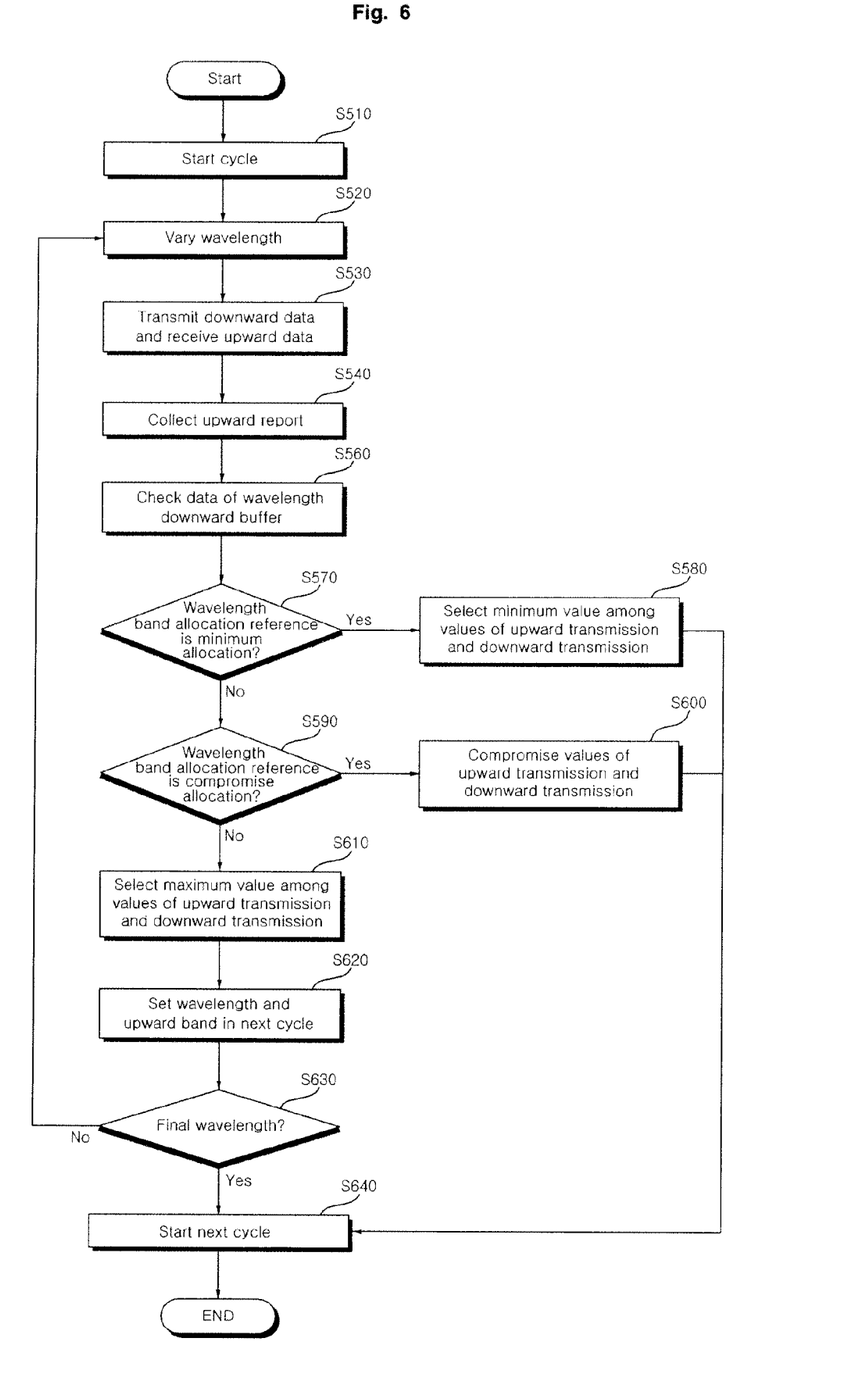
FIG. 6 is a flowchart illustrating a method of allocating a bandwidth of a PON according to an exemplary embodiment of the present invention.

FIG. 6 is a flowchart illustrating a method of allocating a bandwidth of a PON according to an exemplary embodiment of the present invention.

Referring to FIG. 6, when a new cycle starts (S510), a wavelength tunable laser diode TLD of the OLT 100 varies a wavelength (S520).

Downward data are transmitted to the ONT 300 through the varied wavelength by the OLT 100, and the OLT 100 receives upward data from the other ONT 300 (S530).

The OLT 100 receives and records a report from all ONTs in a predetermined wavelength (S540).

The OLT 100 records a data amount of a downward buffer to be transmitted to each wavelength at a time point when downward transmission terminates (S560).

The OLT 100 determines whether a wavelength band allocation reference is minimum allocation (S570).

If a wavelength band allocation reference is minimum allocation, the OLT 100 selects a minimum value among values of upward transmission and downward transmission (S580).

If a wavelength band allocation reference is not minimum allocation, the OLT 100 determines whether a wavelength band allocation reference is compromise allocation (S590).

If a wavelength band allocation reference is compromise allocation, the OLT 100 selects a great value among a value collected by an upward ONT and a downward buffer data size and compares the great value with a maximum transmission window allowed in a wavelength, thereby applying a compromise reference that selects a minimum value (S600).

If a wavelength band allocation reference is not compromise allocation at step S590, the OLT 100 selects a maximum value among a value collected by an upward ONT and a downward buffer data size (S610).

At this time, a transmission time period of a wavelength, a downward wavelength band, and an upward window of the ONT in the next cycle are set (S620). Because, in the maximum allocation method, a great value is selected among an upward band request amount of a previous cycle of the ONTs 300 and a downward buffer size of a predetermined wavelength in a previous cycle.

The OLT 100 determines whether a wavelength is a final wavelength (S630).

If a wavelength is not a final wavelength, the process returns to step S520.

If a wavelength is a final wavelength, the OLT 100 starts a next cycle (S640).

Therefore, in a method of allocating a bandwidth of a PON, a method of allocating a bandwidth thereof can be variously used according to data transmitted in upward transmission or downward transmission. Because a bandwidth can be allocated according to various references, a bandwidth in upward transmission or downward transmission can be efficiently used.

The embodiment of the invention being thus described, it will be obvious that the same may be varied in many ways. Such variations are not to be regarded as a departure from the spirit and scope of the invention, and all such modifications would be obvious to one skilled in the art are intended to be included within the scope of the following claims.

What is claimed is:

1. A method of allocating a bandwidth of a PON, comprising: transmitting downward data to a plurality of ONTs through a first wavelength for a downward wavelength time period in which an OLT is set and receiving upward data and a report message including a requirement for a bandwidth of the plurality of ONTs from the plurality of ONTs through the first wavelength;

setting a downward wavelength time period of a second wavelength according to the report message and a wavelength band allocation reference and dynamically allocating a bandwidth of upward transmission based on the downward wavelength time period; and transmitting a gate message including downward data and the changed bandwidth information of upward transmission to the plurality of ONTs through the second wavelength for the preset downward wavelength time period, wherein the dynamic allocating of a bandwidth comprises allocating, when a wavelength band allocation reference is minimum allocation, a downward wavelength time period and a bandwidth of the second wavelength by recording a data amount of a downward buffer at a time point when downward data transmission of the first wavelength is terminated and by selecting a minimum value among a bandwidth requested through the report message and data of the downward buffer.

2. A method of allocating a bandwidth of a PON, comprising: transmitting downward data to a plurality of ONTs through a first wavelength for a downward wavelength time period in which an OLT is set and receiving upward data and a report message including a requirement for a bandwidth of the plurality of ONTs from the plurality of ONTs through the first wavelength;

setting a downward wavelength time period of a second wavelength according to the report message and a wavelength band allocation reference and dynamically allocating a bandwidth of upward transmission based on the downward wavelength time period; and transmitting a gate message including downward data and the changed bandwidth information of upward transmission to the plurality of ONTs through the second wavelength for the preset downward wavelength time period, wherein the dynamic allocating of a bandwidth comprises allocating, when a wavelength band allocation reference is maximum allocation, a downward wavelength time period and a bandwidth of the second wavelength by recording a data amount of a downward buffer at a time point when downward data transmission of the first wavelength is terminated and by selecting a maximum value among a bandwidth requested through the report message and data of the downward buffer.

3. A method of allocating a bandwidth of a PON, comprising: transmitting downward data to a plurality of ONTs through a first wavelength for a downward wavelength time period in which an OLT is set and receiving upward data and a report message including a requirement for a bandwidth of the plurality of ONTs from the plurality of ONTs through the first wavelength;

setting a downward wavelength time period of a second wavelength according to the report message and a wavelength band allocation reference and dynamically allocating a bandwidth of upward transmission based on the downward wavelength time period; and transmitting a gate message including downward data and the changed bandwidth information of upward transmission to the plurality of ONTs through the second wavelength for the preset downward wavelength time period, wherein the dynamic allocating of a bandwidth comprises allocating, when a wavelength band allocation reference is compromise allocation, a downward wavelength time period and a bandwidth of the second wavelength by recording a data amount of a downward buffer at a time point when downward data transmission of the first wavelength is terminated, by selecting a great value among a bandwidth requested through the report message and data of the downward buffer, by comparing the selected value with a maximum transmission window allowed in the second wavelength, and by selecting a minimum value among the selected value and the maximum allocation window.

* * * * *